US007280216B2

(12) United States Patent
Snyder et al.

(10) Patent No.: US 7,280,216 B2
(45) Date of Patent: Oct. 9, 2007

(54) METHOD AND APPARATUS FOR DETERMINING THE WAVELENGTH OF AN INPUT LIGHT BEAM

(75) Inventors: James J. Snyder, Soquel, CA (US); Stephen L. Kwiatkowski, Sunnyvale, CA (US)

(73) Assignee: Fizeau Electro-Optic Systems, LLC, Matthews, NC (US)

( * ) Notice: Subject to any disclaimer, the term of this patent is extended or adjusted under 35 U.S.C. 154(b) by 431 days.

(21) Appl. No.: 10/672,889

(22) Filed: Sep. 26, 2003

(65) Prior Publication Data

US 2004/0061864 A1    Apr. 1, 2004

Related U.S. Application Data

(60) Provisional application No. 60/480,604, filed on Jun. 23, 2003, provisional application No. 60/447,919, filed on Feb. 19, 2003, provisional application No. 60/413,995, filed on Sep. 27, 2002.

(51) Int. Cl.
*G01B 9/02* (2006.01)
(52) U.S. Cl. .................................... 356/451; 356/477
(58) Field of Classification Search ................ 356/451, 356/477–482, 450, 520
See application file for complete search history.

(56) References Cited

U.S. PATENT DOCUMENTS

| | | | |
|---|---|---|---|
| 3,493,288 A * | 2/1970 | Oltman, Jr. et al. ........ 359/578 |
| 3,612,691 A * | 10/1971 | Schwartz .................... 356/521 |
| 4,173,442 A | 11/1979 | Snyder | |
| 4,319,843 A | 3/1982 | Gornall | |
| 4,779,984 A * | 10/1988 | Cook .......................... 356/451 |
| 5,172,185 A * | 12/1992 | Leuchs et al. .............. 356/482 |
| 5,420,687 A | 5/1995 | Kachanov | |
| 5,543,916 A | 8/1996 | Kachanov | |
| 6,016,197 A * | 1/2000 | Krivoshlykov .............. 356/451 |
| 6,956,653 B1 * | 10/2005 | Lam et al. .................. 356/477 |

OTHER PUBLICATIONS

Snyder, J.J., "Algorithm for fast digital analysis of interference fringes", *Applied Optics 19*, 1223 (1980).

J.H. Bruing, "Fringe Scanning Interferometers", in *Optical Shop Testing*, Daniel Malacara, ed. (John Wiley and Sons, New York, 1978) 409-437.

Katherine Creath, "Phase-Measurement Interferometry Techniques," in *Progress in Optics* XXXVI, E. Wolf, ed. (North-Holland, Amsterdam, 1988), 349-393).

* cited by examiner

*Primary Examiner*—Hwa (Andrew) Lee
(74) *Attorney, Agent, or Firm*—Buchanan, Ingersoll & Rooney LLP

(57) ABSTRACT

A method and apparatus for measuring the wavelength of an input light beam whereby the input light beam is split into two light beams which are directed through two paths of different optical length. The light beams are interfered with each other in order to form a fringe pattern at an observation plane, which fringe pattern is detected and analyzed to thereby determine the wavelength of the input light beam.

55 Claims, 6 Drawing Sheets

METHOD AND APPARATUS FOR DETERMINING THE WAVELENGTH OF AN INPUT LIGHT BEAM

CROSS-REFERENCE TO RELATE APPLICATIONS

This application claims the benefit of U.S. provisional application Ser. No. 60/413,995 filed Sep. 27, 2002; U.S. provisional application Ser. No. 60/447,919 filed Feb. 19, 2003; and U.S. provisional application Ser. No. 60/480,604 filed Jun. 23, 2003, the contents of all of which are incorporated herein in their entirety.

BACKGROUND OF THE INVENTION

1. Field of the Invention

The invention relates to wavemeters, and more particularly, wavemeters based on the Young's interferometer configuration.

2. Description of the Related Art

A laser wavelength meter, or wavemeter, is an instrument that directly measures the wavelength of light emitted by a laser. In the past, wavemeters have been commonly used in spectroscopic studies to monitor the wavelength of a tunable laser that excites some atomic or molecular transition. More recently, wavemeters are used to measure the wavelength of telecom laser sources in Wavelength Division Multiplexing (WDM) networks in order to ensure that the source is properly tuned to its channel in the ITU grid.

The accuracy required of a wavemeter depends on the application: Linear spectroscopy and telecom applications typically require accuracy of about $10^{-6}$ while non-linear spectroscopy may require a more demanding $10^{-7}$ to $10^{-8}$. Commercially available wavemeters offer accuracy ranging from a few parts in $10^{-5}$ to a few parts in $10^{-7}$.

With few exceptions, wavemeters are based on some type of interferometer. The most common class of wavemeter is a form of Michelson interferometer in which the incident laser beam under test is divided by a beam splitter, sent down two different paths to moving retroreflectors that return the beams with smoothly varying optical path difference, and then recombined by the beam splitter to form fringes. See for example U.S. Pat. No. 4,319,843 (Gornall). The fringe intensity, which oscillates as the optical path difference changes, is detected, and the oscillations counted over some time interval. A reference laser beam, of precisely known wavelength, is injected into the same interferometer in parallel with the laser beam under test, and the oscillations of the reference laser's fringes are counted over the same interval. The ratio of the two fringe counts is equal to the inverse ratio of the wavelengths, and since one wavelength is known, the unknown wavelength is easily calculated.

Michelson wavemeters are conceptually simple, straightforward to construct, and capable of high accuracy. However, they require a reference laser as well as a translation stage to move the retroreflectors over relatively long distances at constant velocity, and are therefore not very compact or robust, and do not provide very rapid updates. In addition, since they must count every fringe during a scan distance of the order of a centimeter, they are only applicable to relatively narrow bandwidth cw lasers.

U.S. Pat. No. 4,173,442 (Snyder) discloses a wavemeter based on the Fizeau interferometer. This interferometer consists of a glass plate with a slight wedge that is illuminated by a collimated laser beam. The reflections from the first and second surfaces of the glass plate generate collimated beams that propagate in slightly different directions. Therefore, the two beams produce a pattern of straight, uniformly spaced, sinusoidal fringes over their overlap region. Snyder teaches that this fringe pattern, if recorded by a linear photodiode array and digitized, could be analyzed to determine the wavelength of the laser beam. Unlike the Michelson wavemeters, the Fizeau wavemeter is calibrated during manufacture, and does not require a reference laser. Because the photodiode array records the instantaneous fringe pattern, both cw and pulsed lasers can be measured. Moreover, since it has no moving parts, the Fizeau wavemeter is inherently more robust and can provide a higher measurement update rate than the Michelson wavemeter.

Although the Fizeau wavemeter offers advantages over the Michelson wavemeter, it requires precise opto-mechanical alignment, and it was found to suffer from systematic errors related to chromatic and other aberrations, and from thermo-mechanical instability. Some of these problems are addressed by U.S. Pat. No. 5,420,687 (Kachanov) and U.S. Pat. No. 5,543,916 (Kachanov), who simplified the optical system by eliminating the collimating mirror, and replacing the wedge with a glass plate with parallel surfaces. The Kachanov design produces a fringe pattern similar to the Fizeau, that can be analyzed in the same way. Although the Kachanov design is simpler than the Snyder design, the alignment requirements are similar and in practice the performance is not improved. In addition, it proved technically difficult to reduce the package size of either the Fizeau wavemeter or the Kachanov wavemeter much below the size of other wavemeters of comparable accuracy.

BRIEF SUMMARY OF THE INVENTION

In accordance with the invention, there is provided an apparatus for measuring the wavelength of an input light beam. The apparatus includes an optical device having an input port and two output ports, the optical device defining first and second optical paths which operate to direct light from the input port to the first and second output ports, respectively, and which have optical lengths which differ by a first optical length difference. The two output ports are separated by a separation distance such that light exiting the optical device through the two output ports forms, at an observation plane disposed at a second distance from the two output ports, a fringe pattern whose configuration at the observation plane is a function of the wavelength of the input light beam. The apparatus further includes a photo detector for receiving an image of the fringe pattern at the observation plane and generating one or more detection signals responsive thereto, and a processor implementing a process for analyzing the fringe pattern image received by the photo detector based on the one or more detection signals to thereby determine the wavelength of the input light beam.

Further in accordance with the invention, there is provided a method for measuring the wavelength of an input light beam. The method comprises splitting the input light beam into two light beams, directing the two light beams through two paths of different optical length, interfering light exiting said two paths to thereby form a fringe pattern at an observation plane, detecting an image of the fringe pattern, and analyzing the configuration of said detected image.

Further in accordance with the invention, there is provided an apparatus for measuring the wavelength of an input light beam. The apparatus comprises means for splitting the input light beam into two light beams, means for directing the two light beams through two paths of different optical length, means for causing light exiting the two paths to interfere such that a fringe pattern is formed at an observation plane, means for detecting an image of the fringe pattern, and means for analyzing the configuration of said detected image.

Also in accordance with the invention, there is provided an apparatus for measuring the wavelength of an input light beam. The apparatus includes an optical device having an input port and two output ports, the optical device defining first and second optical paths which operate to direct light from the input port to the first and second output ports, respectively, and which have optical lengths which differ by a first optical length difference. The two output ports are separated by a separation distance such that light exiting the optical device through the two output ports forms, at an observation plane disposed at a second distance from the two output ports, a fringe pattern whose configuration at the observation plane is a function of the wavelength of the input light beam. The apparatus further includes a photo detector for receiving an image of the fringe pattern at the observation plane and generating one or more detection signals responsive thereto, and a processor implementing a process for analyzing the fringe pattern image received by the photo detector based on the one or more detection signals to thereby determine the wavelength of the input light beam. The process includes determining the average spacing between fringes and computing therefrom the wavelength of said incident radiation, determining the exact order number of the light to a reference point on said photo detector, determining to the optical delay at said reference point on said photo detector, and computing from said exact order number and said high accuracy optical delay the wavelength of said input light beam.

BRIEF DESCRIPTION OF THE SEVERAL VIEWS OF THE DRAWINGS

Many advantages of the present invention will be apparent to those skilled in the art with a reading of this specification in conjunction with the attached drawings, wherein like reference numerals are applied to like elements, and wherein.

DETAILED DESCRIPTION OF THE INVENTION

Figure 1:
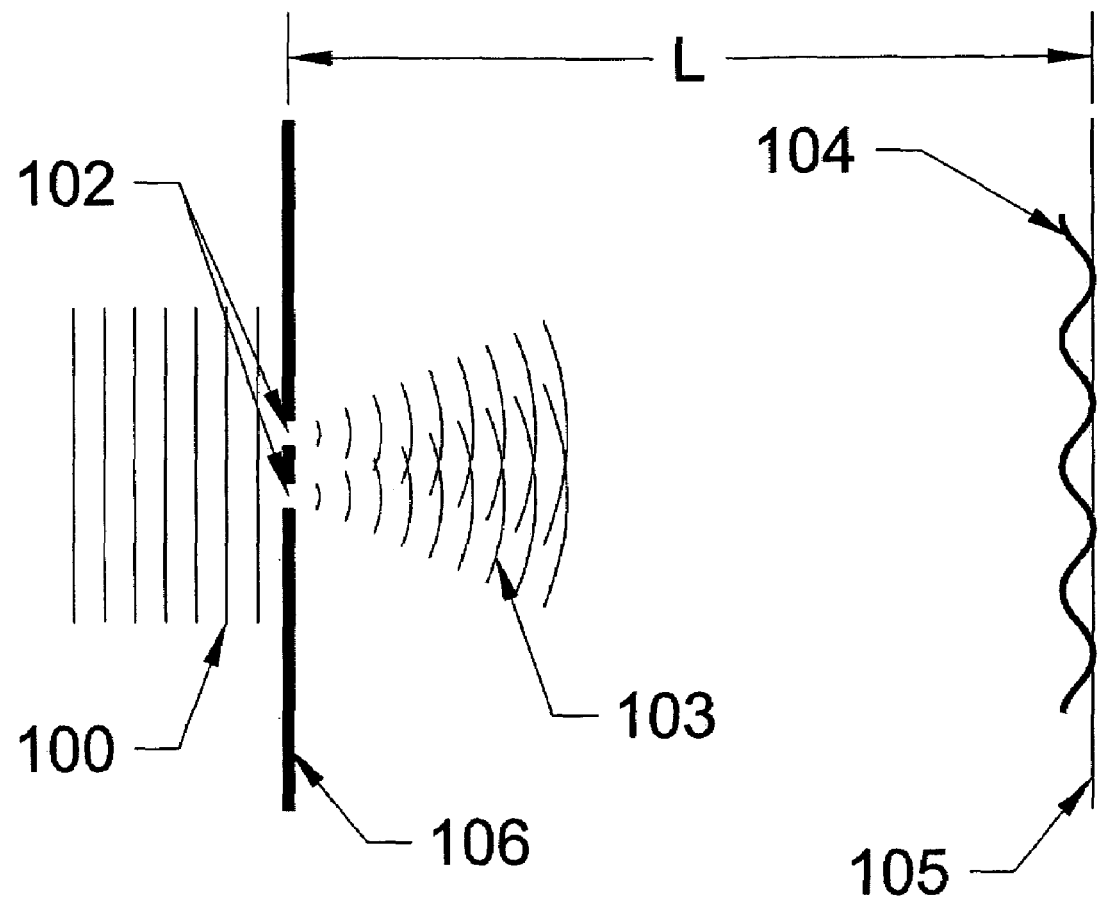
FIG. 1 is a schematic diagram illustrating the principle of a Young's interferometer

FIG. 1 shows a schematic view of prior art known as Young's interferometer. The basic instrument consists of a pair of apertures 102 located in an opaque surface 106 that is illuminated by a normal-incidence collimated beam of light 100. The two apertures 102 transmit light that diffracts in spherical waves 103. At some point a distance L beyond the opaque surface 106 is an observation plane 105. The spherical waves 103 from the apertures 102 form straight, uniformly spaced fringes 104 at the observation plane 105.

The half-angle divergence of the light from each of the apertures 102 is approximately given by $$\theta = \frac{\lambda}{\pi w_0}, \quad (1)$$

where $w_0$ is the radius of the aperture and $\lambda$ is the wavelength of the light. If the separation of the opaque surface 106 and the observation plane 105 is L, then the distance over which the fringes are visible is approximately $$W = 2\theta L. \quad (2)$$

The path difference between the two diffracted waves 103 at the observation plane 105 is given by $$\delta = \frac{xs}{L}, \quad (3)$$

where x is the distance along the observation plane 105 and parallel to a line between the two apertures 102, and s is the separation of said apertures. The peaks of the fringe pattern 104 occur at positions for which $$\frac{\delta}{\lambda} = \frac{xs}{L\lambda} = n, \quad (4)$$

where $$n = 0, \pm 1, \pm 2 \quad (5)$$

is the order number of interference. The distance x is measured from the point directly opposite the midpoint between the two apertures 102. The fringe maximum at x=0 has the order number of 0.

The spatial period of the fringe pattern at the observation plane is the distance between maxima, $$\Lambda = \frac{\lambda L}{s}. \quad (6)$$

The number of fringes visible over the width W is $$M = \frac{2s\theta}{\lambda}. \quad (7)$$

Figure 2:
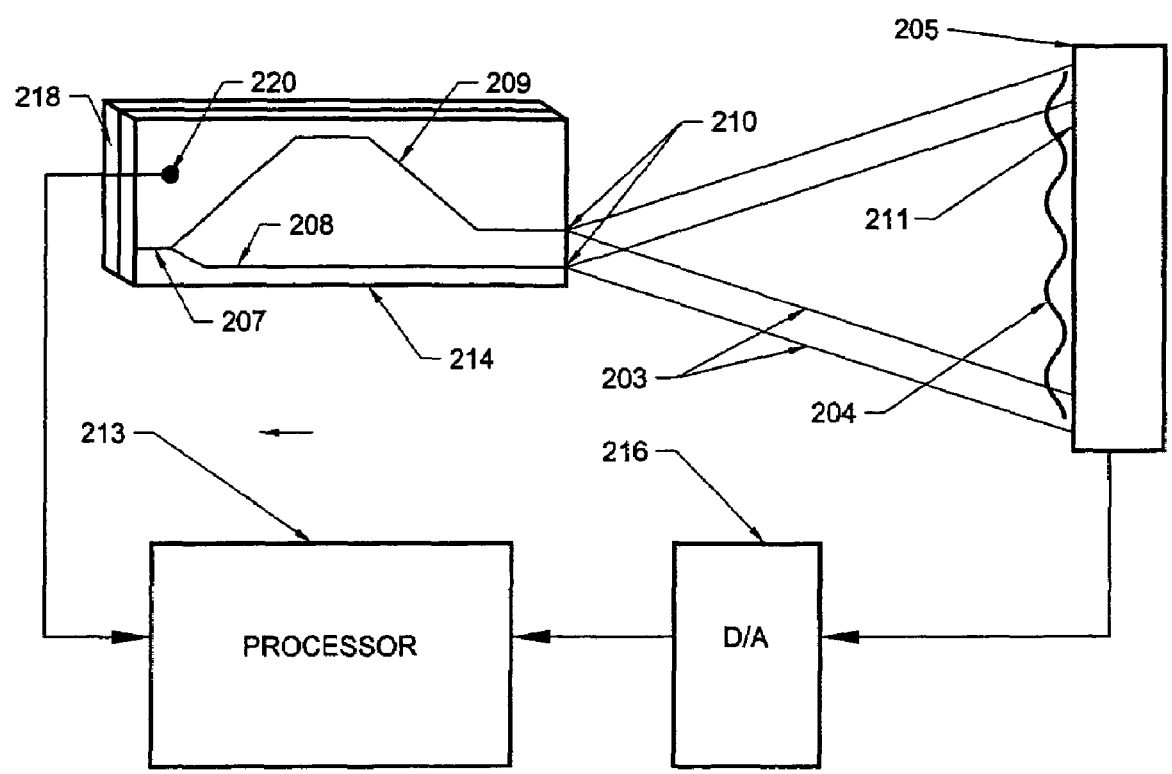
FIG. 2 is block diagram of a wavemeter in accordance with the invention.

FIG. 2 shows a block diagram view of the preferred embodiment of the wavemeter. Light with wavelength in the region of 1.2 to 1.7 μm (to include the telecom regions at 1.3 and 1.5 μm) is coupled into the input port 207 of a planar wave guide beam splitter 214 by means, for example, of a fiber pigtail (not shown). The wave guide is part of an integrated optical circuit and is fabricated from $SiO_2$ on a silicon substrate, using techniques well-known to those familiar with the art. It has a mode diameter of about 9.8 μm in the plane of the substrate. At a wavelength of 1.55 μm, the divergence half-angle of a 9.8 μm diameter mode is 0.1 radians.

The input light is split by the beam splitter into substantially equal amounts of power traveling in a first branch 208 and a second branch 209 of the wave guide. The two branches 208 and 209 of the wave guide have different optical and/or physical lengths, as shown schematically in FIG. 2. In the preferred embodiment, the difference is a physical length difference of about 2.33 mm. The index of refraction of $SiO_2$ at 1.55 μm is 1.444, so the light in the longer path is delayed by 2,500 wavelengths. For other wavelengths, the delay will be more or less. This delay offsets the order number of the fringes so that at the center of the fringe pattern produced by 1.55 μm light, the order number is approximately 2,500. The exact value of the optical delay is found by calibrating the instrument using a laser with a known wavelength.

With reference again to FIG. 2, output ports 210 of the wave guide 214 are positioned facing a photodiode array sensor 211 located at the observation plane 205 disposed about 63.5 mm from the output ports 210. At this distance, and with a divergence half-angle of 0.1 radians, the beams 203 from the two output ports 210 illuminate a spot 12.7 mm in diameter. The photodiode array sensor 211 preferably comprises 512 pixels with about 25 μm center-to-center separation, for a total length of about 12.8 mm, and responds to radiation wavelengths of from about 0.8 to about 1.7 μm. Alternatively, depending on the particular application, a photodiode array sensor responsive to radiation in the range of about 0.4 μm to about 1.1 μm can be selected. The photodiode array sensor 211 can be for example an InGaAs linear image sensor type G8051-512R available from Hamamatsu, or other photo detector having discrete light sensing elements of suitable sensitivity and sufficient resolution to differentiate fringe maxima and minima of the fringe pattern. It will be appreciated that the physical location of the photodiode array 211 is not limited to the observation plane position. The observation plane in this sense is intended to denote a reference position at which a particular configuration of the fringe pattern is formed. However, this configuration can be detected by a photodiode array disposed at the observation plane, or it can be conveyed to a different location, for example through fibers or other means, for detection at a different location. Means, such as wave guides and optical fibers, can be used to transmit this information to locations at which the photodiode array 211 can be more conveniently disposed and which are in fact remote from the observation plane.

Figure 3:
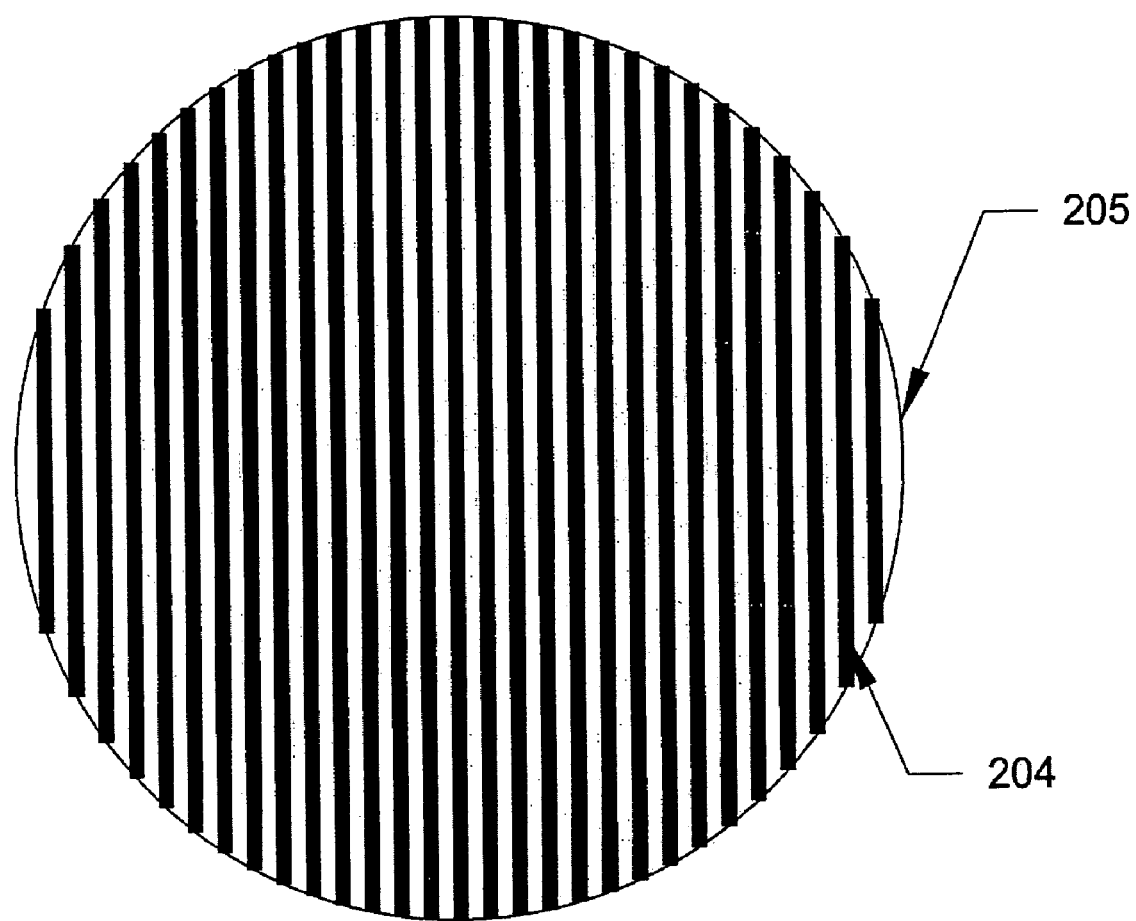
FIG. 3 is a schematic diagram of a fringe pattern generated with the wavemeter of the invention.

The separation between output ports 210 is about 250 μm, which provides approximately 30 fringes 204 across the photodiode array 211. The diffracted light beams 203 from output ports 210 illuminate the photodiode array 211 and produce a fringe pattern 204 that is detected by photodiode array 211. A typical fringe pattern 204 is shown in FIG. 3 as it might appear at the observation plane 205. The linear photodiode array 211 detects the intensity along the horizontal diameter of the pattern 204.

Signals from photodiode array 211 indicative of the configuration of the fringe pattern 204 are transmitted to an analog-to-digital converter 216 and converted thereby to a sequence of digital values. The digital values are further transmitted to a computer or other processor 213 wherein they are processed and analyzed to determine the wavelength of the light as described herein.

The accuracy of the wavelength measurement depends in large part on the stability of the optical delay of the wave guide beam splitter. Both the physical length and the index of refraction of the silica waveguide are functions of temperature, so the optical delay is also a function of temperature. In the preferred embodiment, the planar wave guide 214 is mounted on a heat sink plate 218 of a material with high thermal conductivity, such as copper. The heat sink minimizes temperature gradients along the wave guide. The temperature of the heat sink 218 and/or wave guide 214 can be monitored by one or more temperature sensors 220, which generate temperature signals that are input to processor 213. The monitored temperature is digitized and recorded by the processor 213, which uses the information to calculate the value of the optical delay of the two branches 208 and 209. Alternatively or in addition, the temperature of the heat sink plate 218 can be actively or passively regulated. Active regulation can include for example use of a thermoelectric cooler, and controlling the temperature of the thermoelectric cooler through a feedback loop in connection with a cooling module (not shown).

Figure 5:
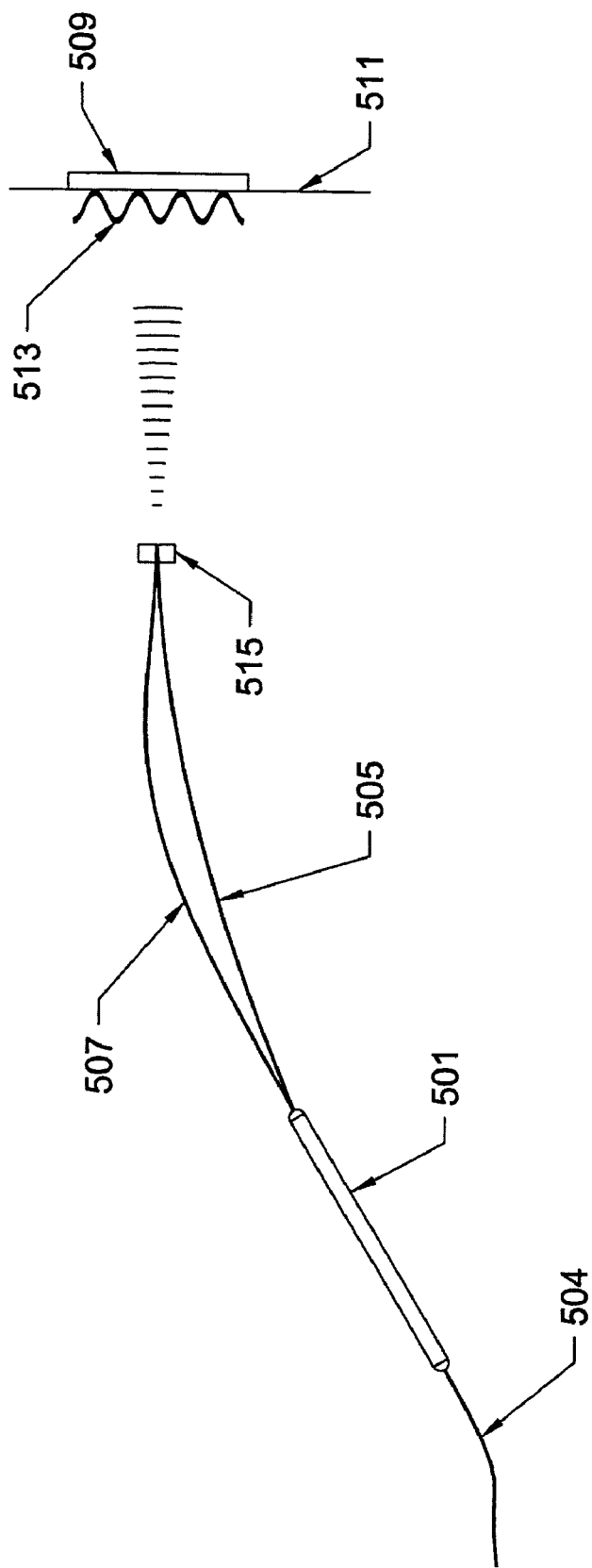
FIG. 5 is a diagram of a wavemeter in accordance with the invention.

Those familiar with the art will appreciate that the beam splitter with optical delay could be realized by means other than a planar wave guide, including fiber optics and bulk optics. For example, an alternate embodiment, shown in FIG. 5, uses a fiber optic coupler arrangement including a fiber optic coupler 501, wherein incoming light (not shown) is directed through an input fiber 504 into two output fibers 505, 507 of lengths differing by 2.33 mm to provide essentially the same splitting of power and introduction of delay as the above arrangement. A photodiode array 509 is disposed at observation plane 511 and generates signals responsive to the fringes 513 formed on the observation plane. The two output fibers 505 and 507 are securely mounted in a silicon V-groove 515, for example one commercially available from Oz Optics in Ontario, Canada, with a separation of 250 μm between the fibers. This spacing provides 32 fringes across the photodiode array 509. Temperature monitoring and/or control can be effected in a similar manner to that described above with respect to the FIG. 2 arrangement.

In the arrangement of FIG. 2, the fringe pattern is detected and digitized using a 512-pixel linear detector array. The digitized image is analyzed statistically to determine the average period of the approximately 30 fringes, and the position (phase) of the center fringe of the pattern. The wavelength is determined by a "bootstrap" process in which the fringe period is converted to an unambiguous, low resolution wavelength value, accurate to within the free spectral range of the interferometer (about 0.620 nm), whereas the position (phase) of the center fringe provides a high-resolution correction within the free spectral range. Although the signal-to-background ratio of individual detector pixels is limited, the statistical analysis improves the measurement resolution to better than $10^{-3}$ for both the period and the phase. Since the phase is the fractional part of an order number of about 2500, the uncertainty in the high resolution correction is better than $10^{-6}$. In effect, limitations in the signal-to-background ratio of the detector array are compensated by averaging over the 512 pixels, providing an ultimate measurement accuracy of about $10^{-6}$. It should be noted that the low resolution, period determination may not be necessary in some applications, where for example, because of the type of laser, the wavelength range in such an instance is limited to something less than the free spectral range, and only the high resolution phase determination will be required to uniquely define the wavelength.

Figure 4:
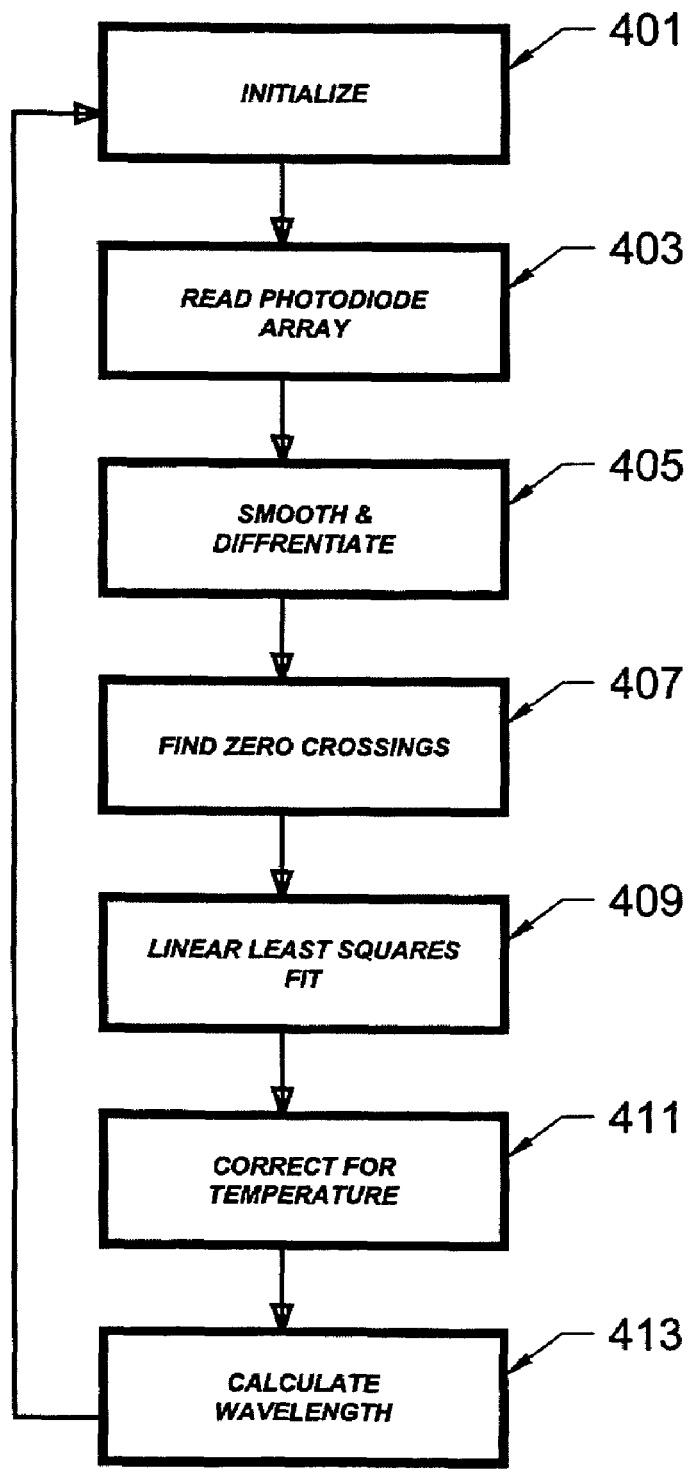
FIG. 4 is a flow chart of an analysis process in accordance with the invention.

The bootstrap analysis method is akin to that taught by U.S. Pat. No. 4,173,442 (Snyder), and is explained technically and in greater detail with reference to FIG. 4. After initialization (Step 401), the photodiode array 211 is read (Step 403) and the data is digitally filtered, for example in accordance with the techniques taught in Snyder, J. J., "Algorithm for fast digital analysis of interference fringes," Applied Optics 19, 1223 (1980), in order to smooth it and remove the dc term(Step 405), and the pixel addresses of the approximately 60 zero crossings are found (407). The sequence of the pixel addresses of the zero crossings is fit by a linear least squares routine to a straight line. (Step 409). The slope of the fitted line, which is inversely proportional to the wavelength, is used to calculate a preliminary wavelength. Because of the filtering and least squares fitting, the uncertainty in the slope of the line, and therefore in the preliminary wavelength is estimated to be about one part in $10^4$, which is sufficient to calculate unambiguously the whole number part of the order number. The fractional part of the order number is equal to the Y-intercept of the fitted line, modulo the spatial period of the fringe pattern. The two parts of the order number are combined to give an exact order number, which is divided into the known optical delay to give the exact wavelength (Step 413). The uncertainty in the fractional part of the order number is similarly estimated to be about one part in 400. Since the whole part of the order number is about 2,500, the combined uncertainty in the wavelength measurement is approximately one part in $10^6$. Any temperature correction and compensation is performed in Step 411.

An alternative to digitizing and analyzing the full array of fringes is to measure the local phase at two points in the fringe pattern. For example, suppose the two points are separated by ten fringes. The difference in phase (divided by two) between the two points varies with wavelength as if the interferometer had an order number of ten, or a free spectral range of 150 nm (at 1550 nm). Therefore, if the input wavelength is restricted to the range of 1475 to 1625 nm (i.e., including the L, C, and S telecom bands), then the difference phase provides an unambiguous, low resolution measure of the wavelength.

On the other hand, the average phase at the two points varies with wavelength according to the average order number of the interferometer, 2500. Therefore, the average phase provides a high resolution correction within the free spectral range of the interferometer.

Assuming that the two phase measurements are made with the same resolution achieved with the linear array, then the low resolution wavelength is sufficiently accurate to resolve the free spectral range of the interferometer, and the high resolution correction provides the same final measurement accuracy of about $10^{-6}$.

In time-domain interferometry, where the interferometric phase can be modulated, phase measurements utilize a procedure referred to as phase-shift interferometry. (See for example J. H. Bruning, "Fringe Scanning Interferometers," in *Optical Shop Testing*, Daniel Malacara, ed. (John Wiley and Sons, New York, 1978), 409-437. See also Katherine Creath, "Phase-Measurement Interferometry Techniques," in *Progress in Optics* XXVI, E. Wolf, ed. (North-Holland, Amsterdam, 1988), 349-393) In phase-shift interferometry, multiple measurements of the fringe intensity are made at different phase values, for example, four measurements of the fringe intensity at phase values separated by p/2. If the four intensity measurements are designated through $I_3$, then the phase, within a fixed offset, is given by $$\phi = \tan^{-1}\left(\frac{I_1 - I_3}{I_0 - I_2}\right). \quad (8)$$

In spatial-domain interferometry, the phase cannot be modulated without introducing undesirable complexity in the interferometer. However, four detectors, spatially separated by about ¼ fringe accomplishes the same function. If the outputs from the four detectors are designated $I_0$ through $I_3$, then the phase is given by Eq. (8). In fact, the four detectors could be coupled to optical fibers, and the distal ends of the fibers held in an array (such as a silicon V-groove) positioned at the desired location in the fringe pattern. Therefore, to measure the phase at two points in the fringe pattern would require two such arrays of pickup fibers, coupled to eight detectors. A measurement of the wavelength would require the digitization of the eight detectors, normalization to account for the Gaussian fringe envelope, and calculation of Eq. (8) twice.

Figure 6:
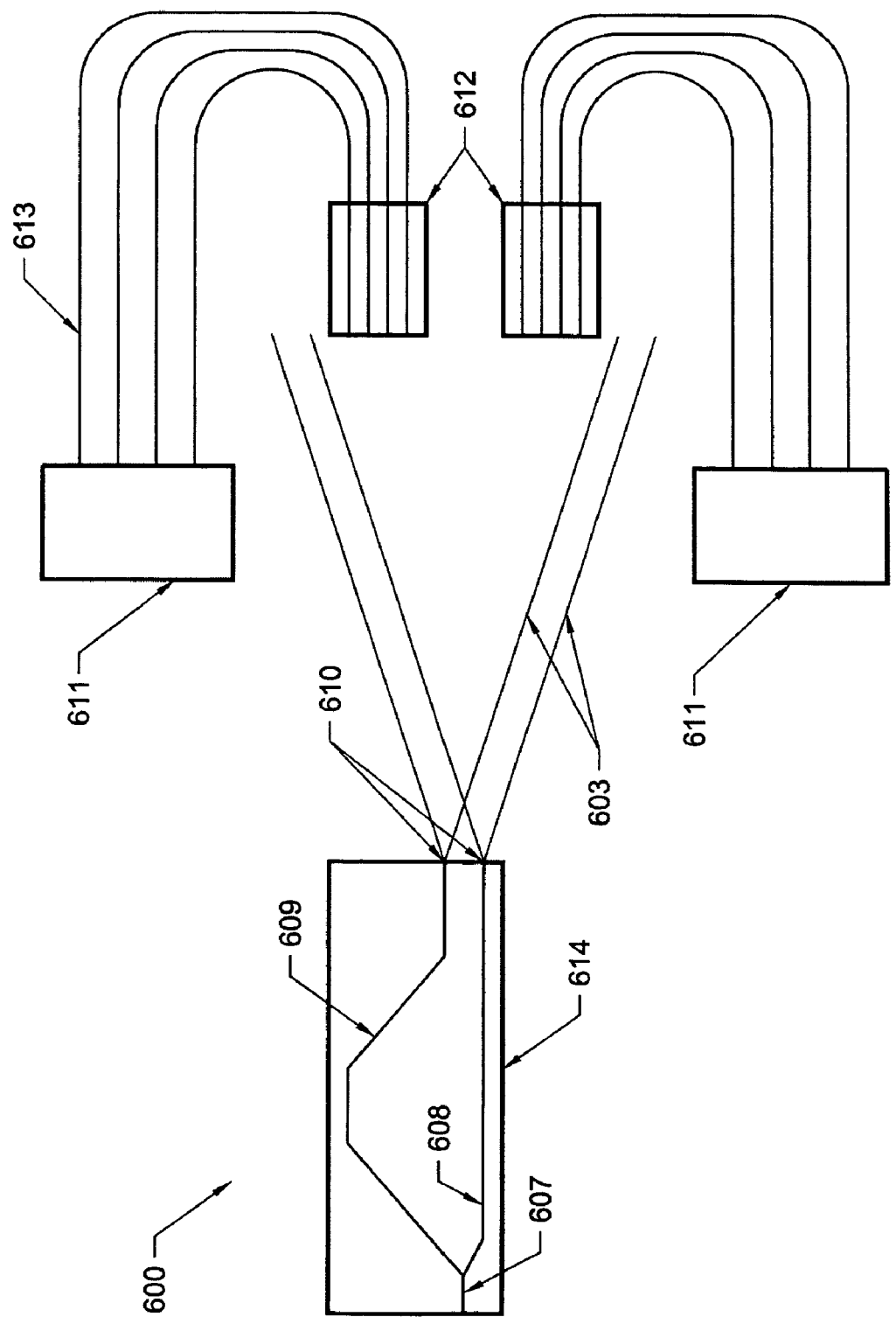
FIG. 6 is a diagram of a phase sensing wavemeter in accordance with the invention.

FIG. 6 shows a block diagram view of a phase-sensing wavemeter 600. Input light with wavelength in the region of about 1.475 to about 1.625 μm is coupled into the input port 607 of integrated optical circuit beam splitter 614 by means of a fiber pigtail (not shown). Integrated optical beam splitter 614 is fabricated from $SiO_2$ on a silicon substrate, and has a mode diameter of about 9.8 μm in the plane of the substrate. At a wavelength of 1.55 μm, the divergence half-angle of a 9.8 μm diameter mode is 0.1 radians.

The input light is split by beam splitter 614 into substantially equal amounts of power traveling in the first branch 608 and the second branch 609 of the integrated optical beam splitter. The two branches 608 and 609 of the beam splitter have different optical and/or physical lengths, as seen schematically from FIG. 6, which shows a physical length difference. In the preferred embodiment, the physical length difference is about 2.33 mm. The index of refraction of $SiO_2$ at 1.55 μm is 1.444, so the light in the longer path is delayed by 2,500 wavelengths. For other wavelengths, the delay will be more or less. This delay offsets the order number of the fringes so that at the center of the fringe pattern produced by 1.55 μm light, the order number is approximately 2,500. The exact value of the optical delay is found by calibrating the instrument using a laser with a known wavelength.

The two output ports 610 of the wave guide 614 are separated by 150 μm, so that the fringe pattern contains about 20 fringes at 1.55 μm. The output ports 610 are positioned facing a pair of phase sensors 612 located at a distance of 96.8 mm. At this distance, the fringe spacing at 1.55 μm is 1.0 mm. The phase sensors 612 (not shown to scale) contain four optical fibers 613 held in a linear array by a silicon v-groove at a spacing of 0.250 mm (¼ fringe). The center-to-center distance between the two phase sensors is 10 mm (10 fringes).

The four fibers 613 from each phase sensor 612 terminate at four infrared detectors (not shown) in a circuit 611 that amplifies and digitizes their signals. The digitized signals from the circuits 611 are then processed in a microprocessor (not shown) according to Eq. (8) above, and combined with the calibration values to determine the wavelength.

Those familiar with the art will realize that the beam splitter with optical delay could be realized by means other than an integrated optical circuit, including fiber optics and bulk optics in a configuration similar to that described above with respect to FIG. 5. For example, an alternate embodiment having a fiber optic splitter with the output fibers cut to lengths differing by 2.33 mm provides essentially the same splitting of power and introduction of delay as the integrated optical circuit of FIG. 6. Moreover, the amount of optical delay is not critical, but could vary between 1 and 5 mm, or more, depending on the pixel signal-to-noise ratio of the detector and on the fringe pattern stability.

It will also be apparent to those familiar with the art that the separation of the two output fibers 210 and 610 in FIG. 2 and FIG. 6 can have values other than those described above. For example, the fiber separation could be as little as 0.050 mm to as much as 5 mm in alternative embodiments.

Those familiar with the art will also realize that although the preferred embodiment described herein is intended for use at telecom wavelengths (around 1.5 µm), a similar device could be built for use at other wavelengths. For the visible spectrum, for example, Si detectors for the phase sensors and a fiber or integrated optical coupler that operates at visible wavelengths could be used in lieu of the infrared components of the preferred embodiment.

Further, it will be appreciated that the accuracy of the wave meter might be affected by polarization mode dispersion in the output branches 208 and 209 of the interferometer. In the presence of polarization mode dispersion, the optical path difference of the interferometer will be different for different input polarizations, which may adversely affect the accuracy. For situations for which this is a problem, a polarizer (not shown) in front of the phase sensors could be used to restrict the phase measurement to a single polarization state. Alternatively, a polarization sensor (also not shown) could sense the output polarization state, so that the processor can apply a correction term.

The above are exemplary modes of carrying out the invention and are not intended to be limiting. It will be apparent to those of ordinary skill in the art that modifications thereto can be made without departure from the spirit and scope of the invention as set forth in the following claims.

The invention claimed is:

1. An apparatus for measuring the wavelength of an input light beam, the apparatus comprising:
    an optical waveguide having an input port and two output ports, the optical waveguide defining first and second optical paths which operate to direct light from the input port to the first and second output ports, respectively, and which have physical path lengths which differ by a preset amount to yield a first optical length difference therebetween, wherein the two output ports are located in a common plane normal to the direction of propagation of the central light rays emitted therefrom and are separated by a separation distance such that light exiting the optical waveguide through the two output ports forms, at an observation plane disposed at a second distance from the two output ports, a fringe pattern whose configuration at the observation plane is a function of the wavelength of the input light beam;
    a photo detector adapted to generate one or more detection signals in response to said fringe pattern; and
    a processor responsive to said detection signals and operative;
    to determine an average period of the fringes evidenced by said detection signals and the phase of a selected fringe evidenced by the detection signals;
    to determine an exact order number of the light to a reference point on said photo detector based on the average period and phase;
    to determine an optical delay of said first optical length difference at said reference point; and
    to divide said optical delay by said exact order number to get the wavelength of the input light beam.

2. The apparatus of claim 1, wherein the optical waveguide comprises an integrated optical circuit including waveguide beam splitter, optical phase delay, and output ports.

3. The apparatus of claim 1, further comprising a heat sink in thermal communication with optical waveguide.

4. The apparatus of claim 3, wherein the temperature of the optical waveguide is actively and/or passively regulated through the heat sink.

5. The apparatus of claim 1, further comprising a temperature sensor generating temperature signals indicative of the temperature of the optical waveguide, said processor being operative to determine an optical delay in the first and second optical paths as a function of said temperature signals.

6. The apparatus of claim 2, wherein the integrated optical circuit comprises SiO2 on a silicon substrate.

7. The apparatus of claim 1, wherein the first optical length difference is a physical length difference of about 2.33 mm.

8. The apparatus of claim 1, wherein the separation distance of the two output ports is about 250 µm.

9. The apparatus of claim 1, wherein the second distance is about 63.5 mm.

10. The apparatus of claim 1, wherein the discrete light sensing elements of the photo detector are spaced about 25 µm center-to-center.

11. The apparatus of claim 1, wherein the photo detector responds to light of wavelengths in the range of from about 0.8 µm to about 1.7 µm.

12. The apparatus of claim 1, wherein the photo detector responds to light of wavelengths in the range of from about 0.4 µm to about 1.1 µm.

13. The apparatus of claim 1, wherein the optical waveguide comprises an input port, a fiber optic beam splitter, and two optic fibers respectively interposed between said beam splitter and output ports.

14. The apparatus of claim 1, wherein the processor is operative to determine a phase difference between two points in the fringe pattern from said detection signals.

15. The apparatus of claim 14, wherein the processor is operative to determine the average phase at the two points from said detection signals.

16. The apparatus of claim 1, wherein the processor is operative to determine the average phase at two points in the fringe pattern from the detection signals.

17. An apparatus for measuring the wavelength of an input light beam, the apparatus comprising:
    an optical device having an input port and two output ports, the optical device defining first and second optical paths which operate to direct light from the input port to the first and second output ports, respectively, and which have optical lengths which differ by a first optical length difference, wherein the two output ports are separated by a separation distance such that light exiting the optical device through the two output ports forms, at an observation plane disposed at a second distance from the two output ports, a fringe pattern whose configuration at the observation plane is a function of the wavelength of the input light beam;
    a photo detector adapted to generate one or more detection signals in response to said fringe pattern;
    a processor implementing a process for analyzing said one or more detection signals to thereby determine the wavelength of the input light beam; and
    one or more arrays of optical fibers having input ends configured to receive the fringe pattern.

18. The apparatus of claim 17, wherein the number of arrays is two, and wherein the input ends of the fibers of each array are separated by ¼ fringe distance.

19. The apparatus of claim 17, wherein the separation of the output ports is about 150 µm.

20. The apparatus of claim 17, wherein the second distance is about 96.8 mm.

21. A method for measuring the wavelength of an input light beam by use of a wavemeter, the method comprising:
launching the input light beam into a waveguide of the wavemeter;
splitting the input light beam in the waveguide into two light beams;
directing the two light beams through two waveguide paths of different optical length and having two exit ports that are located in a plane normal to the direction of propagation of the central light rays exiting from said exit ports, said two waveguide paths having physical path lengths which differ by a preset amount to yield an optical path length difference therebetween;
interfering light exiting said two paths to thereby form a fringe pattern at an observation plane;
detecting the fringe pattern;
determining, by use of a processor of the wavemeter, an average period of fringes and the phase of a selected fringe of the detected fringe pattern;
analyzing the average period and phase to thereby determine the wavelength of the input light beam; and
causing the wavemeter to provide information of the determined wavelength to a user.

22. The method of claim 21, wherein said analyzing comprises:
determining a phase difference between two points in the fringe pattern.

23. The method of claim 22, wherein said analyzing comprises:
determining the average phase at the two points.

24. The method of claim 21, wherein said analyzing comprises:
determining the average phase at two points in the fringe pattern.

25. The method of claim 21, further comprising:
actively and/or passively regulating the temperature of the two paths.

26. The method of claim 21, further comprising:
generating temperature signals indicative of the temperature in the two paths; and
determining an optical delay in the two paths as a function of said temperature signals.

27. The method of claim 21, wherein the waveguide is an optical fiber.

28. The method of claim 21, wherein said input light beam is split by means of an integrated optical circuit.

29. An apparatus for measuring the wavelength of an input light beam, the apparatus comprising:
means for splitting the input light beam into two light beams;
means for directing the two light beams through two waveguide paths of different optical length and having two exit ports that are located in a plane normal to the direction of propagation of the central light rays exiting from said exit ports, said two waveguide paths having physical path lengths which differ by a preset amount to yield an optical path length difference therebetween;
means for causing light exiting the two paths to interfere such that a fringe pattern is formed at an observation plane;
means for detecting the fringe pattern; and
means for determining an average period of fringes of the fringe pattern and the phase of a selected fringe of the fringe pattern and for calculating the wavelength of the input light beam based on the average period of the fringes and phase.

30. The apparatus of claim 29, wherein said means for determining an average period determines a phase difference between two points in the fringe pattern.

31. The apparatus of claim 30, wherein said means for determining an average period determines the average phase at the two points.

32. The apparatus of claim 29, wherein said means for determining an average period determines the average phase at two points in the fringe pattern.

33. The apparatus of claim 29, further comprising:
means for actively and/or passively regulating the temperature of the two paths.

34. The apparatus of claim 29, further comprising:
means for generating temperature signals indicative of the temperature in the two paths, said means for determining an average period being operative to determine an optical delay in the two paths as a function of said temperature signals.

35. An apparatus for measuring the wavelength of an input light beam, the apparatus comprising:
an optical device having an input port and two output ports, the optical device defining first and second optical paths which operate to direct light from the input port to the first and second output ports, respectively, and which have physical path lengths which differ by a preset amount to yield a first optical length difference therebetween, wherein the two output ports are in a common plane normal to the direction of propagation of the central light rays emitted therefrom, and are separated by a separation distance such that light exiting the optical device through the two output ports forms, at an observation plane disposed at a second distance from the two output ports, a fringe pattern whose configuration at the observation plane is a function of the wavelength of the input light beam;
a photo detector adapted to generate one or more detection signals in response to said fringe pattern; and
a processor implementing a process for analyzing the one or more detection signals to thereby determine the wavelength of the input light beam, said process including:
determining the average spacing between fringes and computing therefrom a preliminary wavelength of light;
determining the phase and computing the exact order number of the light to a reference point on said photo detector based on the phase; determining an optical delay of said first optical length difference at said reference point on said photo detector; and
computing from said exact order number and said optical delay the wavelength of said input light beam.

36. The apparatus of claim 35, wherein the optical device comprises an integrated optical circuit.

37. The apparatus of claim 35, further comprising a heat sink in thermal communication with the optical device.

38. The apparatus of claim 37, wherein the temperature of the optical device is actively and/or passively regulated through the heat sink.

39. The apparatus of claim 35, further comprising a temperature sensor generating temperature signals indicative of the temperature of the optical device, said process for analyzing the one or more detection signals further including determining an optical delay in the first and second optical paths as a function of said temperature signals.

40. The apparatus of claim 36, wherein the integrated optical circuit comprises SiO2 on a silicon substrate.

41. The apparatus of claim 35, wherein the first optical length difference is a physical length difference of about 2.33 mm.

42. The apparatus of claim 35, wherein the separation distance of the two output ports is about 250 μm.

43. The apparatus of claim 35, wherein the second distance is about 63.5 mm.

44. The apparatus of claim 35, wherein the discrete light sensing elements of the photo detector are spaced about 25 μm center-to-center.

45. The apparatus of claim 35, wherein the photo detector responds to light of wavelengths in the range of from about 0.8 μm to about 1.7 μm.

46. The apparatus of claim 35, wherein the photo detector responds to light of wavelengths in the range of from about 0.4 μm to about 1.1 μm.

47. The apparatus of claim 35, wherein the optical device comprises a fiber optic coupler whose output fibers provide the required optical phase delay.

48. The apparatus of claim 47, wherein the first optical length difference is a physical length difference of about 2.33 mm.

49. The apparatus of claim 47, wherein the separation distance of the two output ports is about 250 μm.

50. An apparatus for measuring the wavelength of an input light beam, the apparatus comprising:
an optical device having an input port and two output ports, the optical device defining first and second optical paths which operate to direct light from the input port to the first and second output ports, respectively, and which have optical lengths which differ by a first optical length difference, wherein the two output ports are separated by a separation distance such that light exiting the optical device through the two output ports forms, at an observation plane disposed at a second distance from the two output ports, a fringe pattern whose configuration at the observation plane is a function of the wavelength of the in put light beam;
a photo detector adapted to generate one or more detection signals in response to said fringe pattern;
a processor implementing a process for analyzing the one or more detection signals to thereby determine the wavelength of the input light beam, said process including:
determining the average spacing between fringes and computing therefrom a preliminary wavelength of the light;
determining the exact order number of the light to a reference point on said photo detector;
determining an optical delay at said reference point on said photo detector; and
computing from said exact order number and said optical delay the wavelength of said input light beam; and
one or more arrays of optical fibers having input ends configured to receive the fringe pattern.

51. The apparatus of claim 50, wherein the number of arrays is two, and wherein the input ends of the fibers of each array are separated by ¼ fringe distance.

52. The apparatus of claim 1, wherein the preset amount is at least 1 mm.

53. The method of claim 21, wherein the preset amount is at least 1 mm.

54. The apparatus of claim 29, wherein the preset amount is at least 1 mm.

55. The apparatus of claim 35, wherein the preset amount is at least 1 mm.

* * * * *